(12) United States Patent
Bucchieri et al.

(10) Patent No.: US 8,806,527 B2
(45) Date of Patent: Aug. 12, 2014

(54) SYSTEMS, APPARATUSES, AND METHODS FOR PROVIDING COMMUNICATIONS BETWEEN A REMOTE CONTROL AND AN ADVERTISING SOURCE

(75) Inventors: Vittorio Bucchieri, Wakefield, MA (US); Joel Angiolillo, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 849 days.

(21) Appl. No.: 11/777,582

(22) Filed: Jul. 13, 2007

(65) Prior Publication Data

US 2009/0019470 A1    Jan. 15, 2009

(51) Int. Cl.
*H04N 7/10* (2006.01)
*H04N 7/173* (2011.01)
*H04N 7/16* (2011.01)

(52) U.S. Cl.
USPC .............. 725/32; 725/131; 725/141; 725/153

(58) Field of Classification Search
USPC .......................................... 725/133, 141, 153
See application file for complete search history.

(56) References Cited

U.S. PATENT DOCUMENTS

| 5,410,326 | A | * | 4/1995 | Goldstein | 348/734 |
| 6,882,299 | B1 | * | 4/2005 | Allport | 341/176 |
| 2003/0067554 | A1 | * | 4/2003 | Klarfeld et al. | 348/461 |
| 2005/0055640 | A1 | * | 3/2005 | Alten | 715/719 |
| 2005/0076393 | A1 | * | 4/2005 | Sussman | 725/137 |

* cited by examiner

*Primary Examiner* — John Schnurr
*Assistant Examiner* — Christine Kurien

(57) ABSTRACT

A system for providing communications between a remote control and an advertising source is provided. The system includes a television system configured to receive content and to provide a content indicator representing received content. A remote control is also included in the system, the remote control having a local communications unit and a remote communications unit. The local communications unit is configured to communicate with the television system so as to receive from the television system the content indicator. The remote communications unit is configured to send a content indication signal to an advertising source in a manner independent of the television system, the content indication signal being related to the content indicator. The system is further configured to receive advertising from the advertising source based on the content indication signal and to output the advertising at the remote control. Also provided are corresponding apparatuses, methods, and computer program products.

7 Claims, 9 Drawing Sheets

SYSTEMS, APPARATUSES, AND METHODS FOR PROVIDING COMMUNICATIONS BETWEEN A REMOTE CONTROL AND AN ADVERTISING SOURCE

BACKGROUND INFORMATION

Current household remote controls are expanding their capabilities. These devices are no longer limited to the relatively simple task of controlling a television, but are now used to control devices throughout the home, from audio systems to home security systems. Further, modern remote controls can also incorporate a variety of input and output devices besides the common keypad, for example, microphones, speakers, standard or touch-sensitive electronic displays or screens, motion sensors, keyboards, and so on. Overall, the functionality of remote controls is increasing over time.

In part due to the expanding functionality highlighted above, the remote control has become one of the most significantly used devices in the home. As such, it may be useful to try to integrate further functionality into remote controls, thereby utilizing the ubiquitous nature of the remote control and potentially obviating the need for separate physical devices that must otherwise be retained to provide the further functionality in addition to the remote control.

BRIEF DESCRIPTION OF THE SEVERAL VIEWS OF THE DRAWING(S)

DETAILED DESCRIPTION

Exemplary embodiments now will be described more fully hereinafter with reference to the accompanying drawings. Like numbers refer to like elements throughout.

Figure 1:
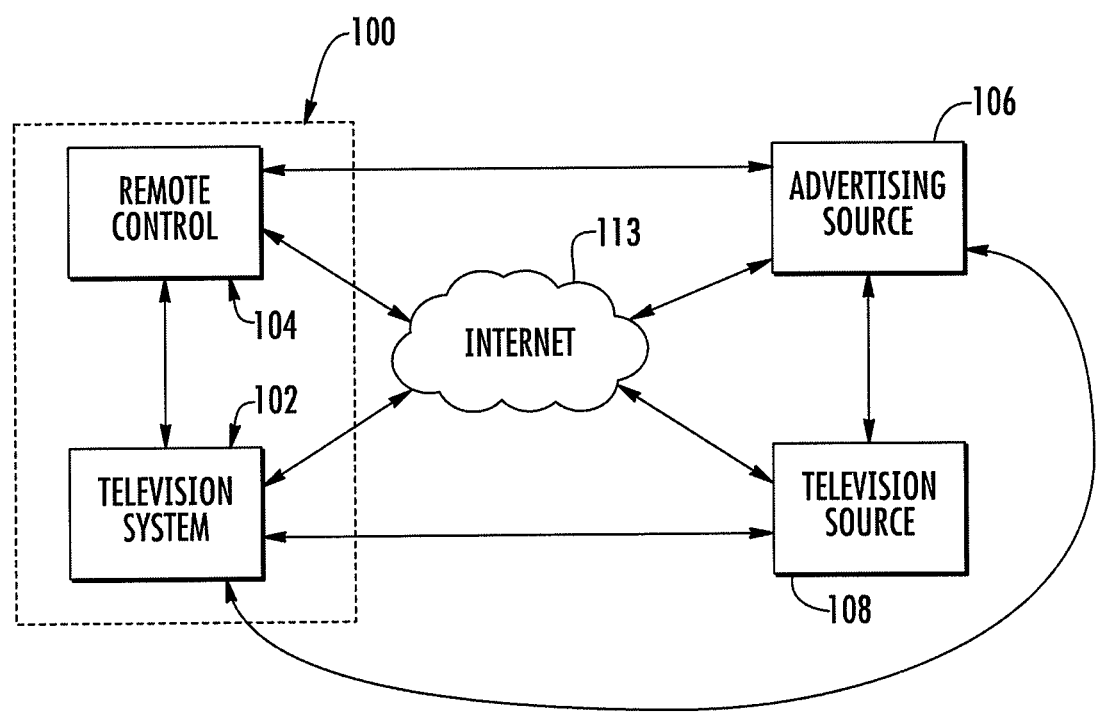
FIG. 1 is a block diagram representing a communications system configured in accordance with an exemplary embodiment and including a television system and a remote control.

Referring to FIG. 1, therein is shown a block diagram representing a communications system 100 configured in accordance with an exemplary embodiment, the communications system 100 including a television system 102 and a remote control 104. The communications system 100 can communicate with various devices and/or entities, such as an advertising source 106 and/or a television source 108, such as a media or content source.

Figure 2A:
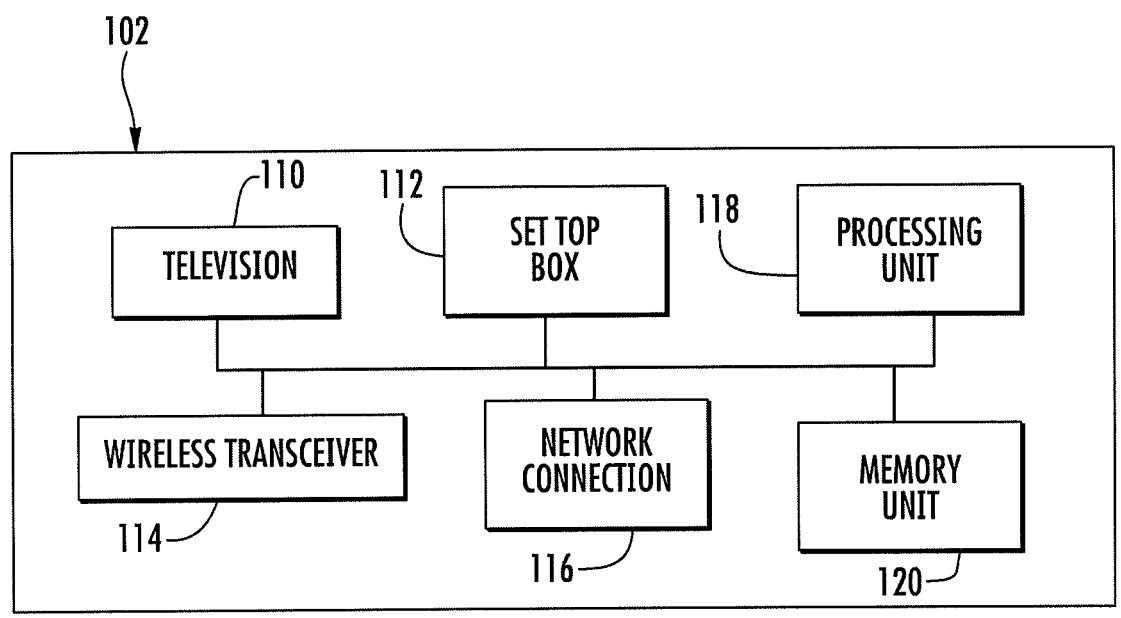
FIG. 2A is a block diagram representing an exemplary embodiment of the television system of FIG. 1.

Referring to FIG. 2A, therein is shown a block diagram representing the television system 102, the television system being configured in accordance with an exemplary embodiment. The television system 102 may include, for example, a television 110 and a set top box 112. The television system 102 can be configured to receive content such as, for example, music or video broadcast content, on-demand content, etc. The content can be received from the television source 108, for example, as streaming digital content from a content server, as a content download, as broadcast content, etc. Content may be transmitted directly from the television source 108 to the television system 102 over a private network or may be provided via an intermediate device or a network such as the Internet 113.

The television system 102 can also be configured to provide a content indicator representing received content, such as content received by the television system 102 from the television source 108. For example, the television system 102 can include a wireless transceiver 114 that transmits a signal indicative of the content received at the set top box 112 and/or displayed by the television 110. The content indicator could indicate, for example, the subject matter of the content, a program title, a genre, and/or component or characteristic elements of the content (e.g., actors, products, etc.). The television system 102 may also include a network connection 116, such as a wireless network connection, a cellular network connection, and/or an Ethernet connection; a processing unit 118 such as a processor or other computing device; and/or a memory unit 120. In some embodiments, one or more of the television 110, the set top box 112, the network connection 116, the processing unit 118, and the memory 120 may be integrated together. In some embodiments, the content indicator for certain content may be included as part of the metadata associated with the content as it is received by the television system 102.

Figure 2B:
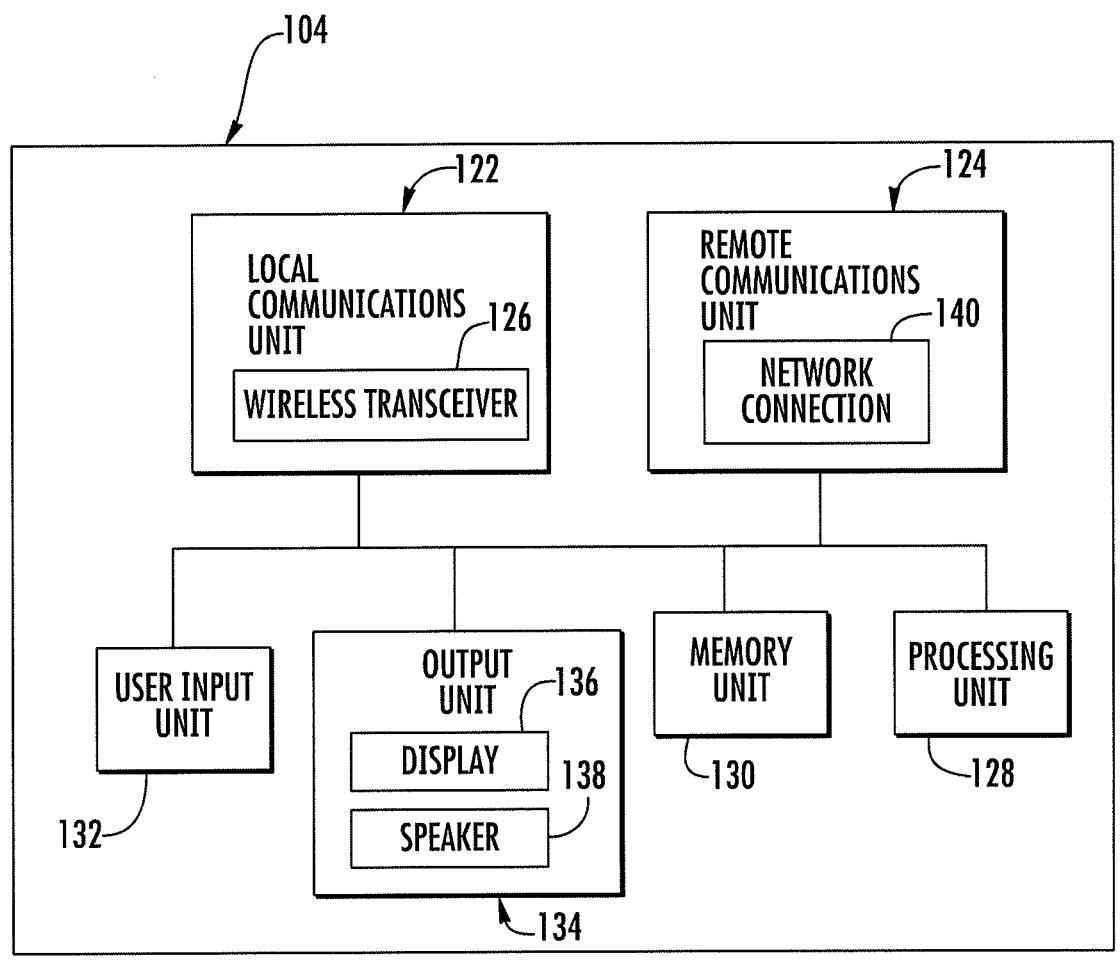
FIG. 2B is a block diagram representing an exemplary embodiment of the remote control of FIG. 1.

Referring to FIG. 2B, therein is shown a block diagram representing the remote control 104, the remote control being configured in accordance with an exemplary embodiment. The remote control 104 can include a local communications unit 122 and a remote communications unit 124. The local communications unit 122 can be configured to communicate with the television system 102 (FIG. 1) so as to receive from the television system the content indicator. For example, the local communications unit 122 can include a wireless transceiver 126 for receiving signals from the television system 102. The local communications unit 122 may also emit signals that can be received by the television system 102 (e.g., by the wireless transceiver 114) and thereby affect the operation of the television system (e.g., cause the set top box 112 to tune to a different channel, change the volume of the television 110, etc.). The wireless transceivers 114, 126 can be any type of communications transceivers that support any of a variety of forms of wireless communication, including, for example, IR communications, radio frequency (RF) communications, Bluetooth, and/or Wi-Fi.

The remote control 104 may also include a processing unit 128, such as a processor or other computing device, and a memory unit 130 for extracting content identification information from content indicators received from the television system 102, and these components can be integrated with the local communications unit 122 and/or the remote communications unit 124. Further, the remote control 104 may include a user input unit 132, including, for example, a keyboard or keypad, screen-labeled softkeys, dedicated buttons, microphone, and/or other components configured to capture user commands; and may include an output unit 134 having, for example, a display 136 and/or an audio speaker 138.

Referring to FIGS. 1, 2A, and 2B, the remote communications unit 124 can be configured to send a content indication signal to the advertising source 106. The content indication signal can be related to the content indicator and can specify one or more aspects of the content received at the television system 102 in a manner similar to that discussed with respect to the content indicator, although the content indication signal and content indicator may not coincide (e.g., the content indicator may specify various aspects of the content, while the content indication signal may specify only a subset of those aspects). The content indication signal may be sent in a manner independent of the television system 102, such that communications between the remote control 104 and the television system are not necessary for the content indication signal to reach the advertising source 106. For example, the remote communications unit 124 can include a network connection 140, such as a wireless network connection, a cellular network connection, and/or an Ethernet connection, and may send the content indication signal to the advertising source 106 via the Internet 113. As such, embodiments of the remote control 104 may serve as a communications link between devices such as the television system 102, which are typically local to the remote control, and devices that may be located remotely from the remote control.

The communications system 100 can be configured to receive advertising from the advertising source 106 based on the content indication signal. The advertising source 106 can be any source of advertising or informational materials, including, for example, an advertising server, a content provider, a broadcaster, a public service provider, and/or a product producer/distributor. In response to receiving the content indication signal, the advertising source 106 may send advertising materials to the television system 102 and/or the remote control 104. For example, the advertising material may be received by the set top box 112 and output via the television 110, and/or may be received by the remote communications unit 124 and output via the display 136 and/or the audio speaker 138 of the remote control. Further, advertising materials received by either one of the television system 102 or remote control 104 may be communicated to the other of those devices for output. The advertising materials may include, for example, audio or video clips, pictures, and/or text. The informational materials may be directed to a product present in the content (e.g., information about a shirt worn by one of the actors present in the content), an expanded version of abbreviated advertisement materials (e.g., more detailed information regarding a product advertised in a standard television commercial), advertisements for products or services related to the content subject matter (e.g., in association with a program related to home improvements, advertisements related to paint or tools), general informational materials (e.g., in association with a program set in Maui, Hi., current demographic and weather information for Maui) etc. The advertising material that is provided from the advertising source 106 may be determined by user-specific preferences that are stored at the advertising source, at the remote control 104, or elsewhere.

Figure 3A:
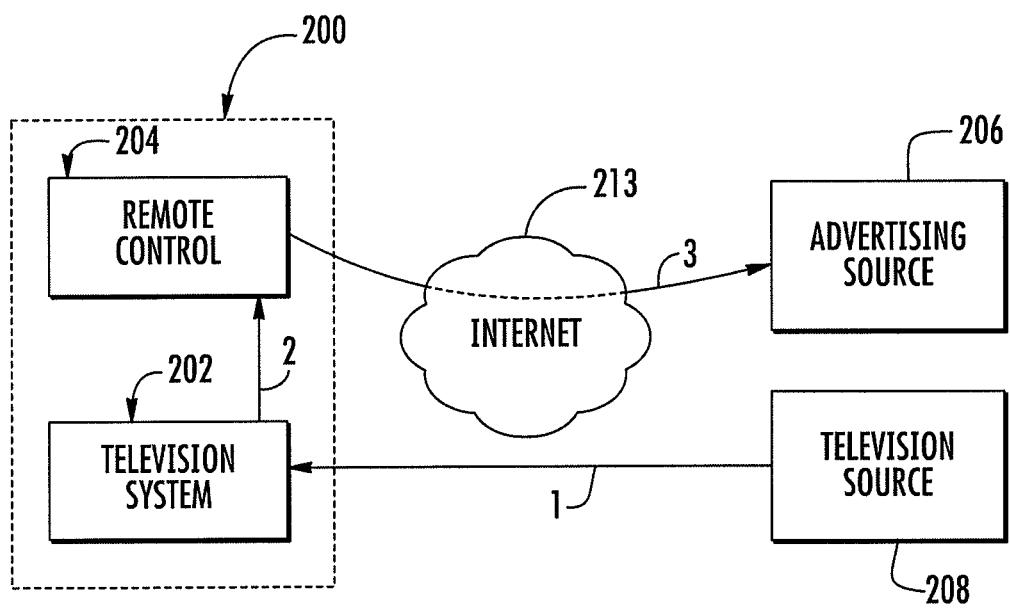
FIG. 3A is a block diagram of a communications system configured in accordance with an exemplary embodiment, illustrating potential communications interactions between various entities and/or devices in providing an indication of content to an advertising source.
Figure 4:
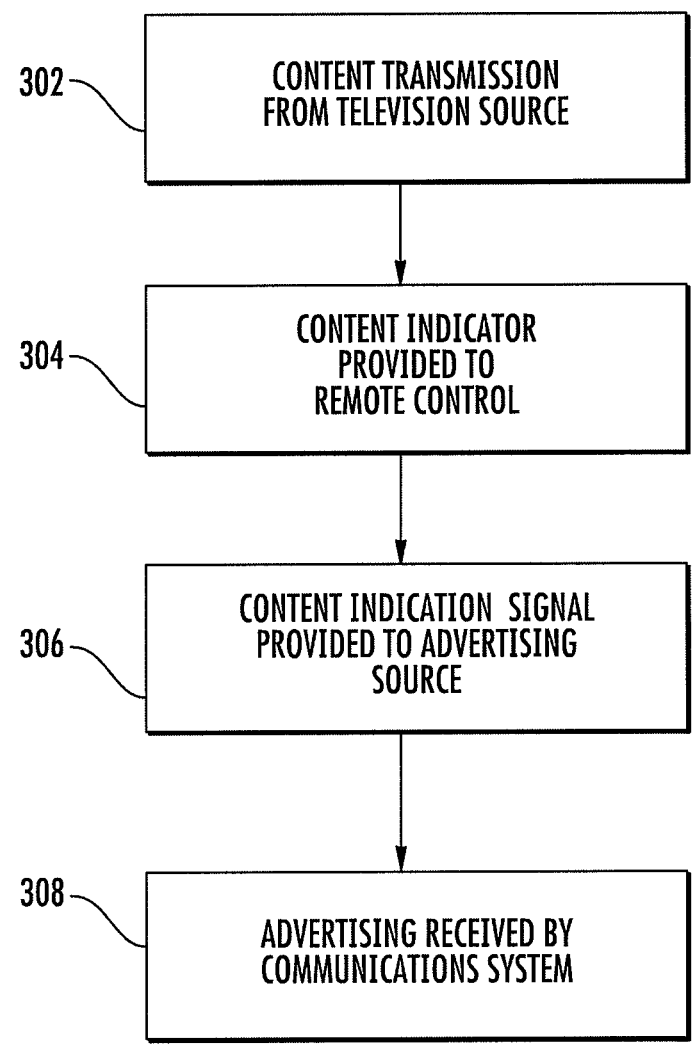
FIG. 4 is a flow chart representing the operation of the communications system of FIGS. 3A and 3B.

Referring to FIGS. 3A and 4, therein are respectively shown a block diagram of a communications system 200 configured in accordance with an exemplary embodiment, illustrating potential communications interactions between various entities and/or devices in providing an indication of content to an advertising source 206, and a flow chart representing the operation of the communications system. At Block 302, a content transmission, indicated by 1, may be provided from a television source 208 to a television system 202. Subsequently at Block 304, a content indicator representing the content transmitted in 1 can be provided by the television system 202 to a remote control 204 via transmission 2, and at Block 306 a corresponding content indication signal can be provided from the remote control to the advertising source 206 in transmission 3, perhaps via the Internet 213. In some embodiments, the television system 202 can be configured to send the content indicator in response to one or more triggers embedded in the content received in transmission 1. An example of such a trigger is, in the case of an analog television transmission, a set of command instructions included in a data string embedded in the non-viewable scan lines (i.e., the Vertical Blanking Interval). In the case of a digital television transmission involving a digital video data stream, an example of a trigger is a set of command instructions included in a code embedded in the video data stream. In both cases, the embedded string or code is recognized as non-video data and a command to perform some action by the television system receiving the transmission.

Figure 3B:
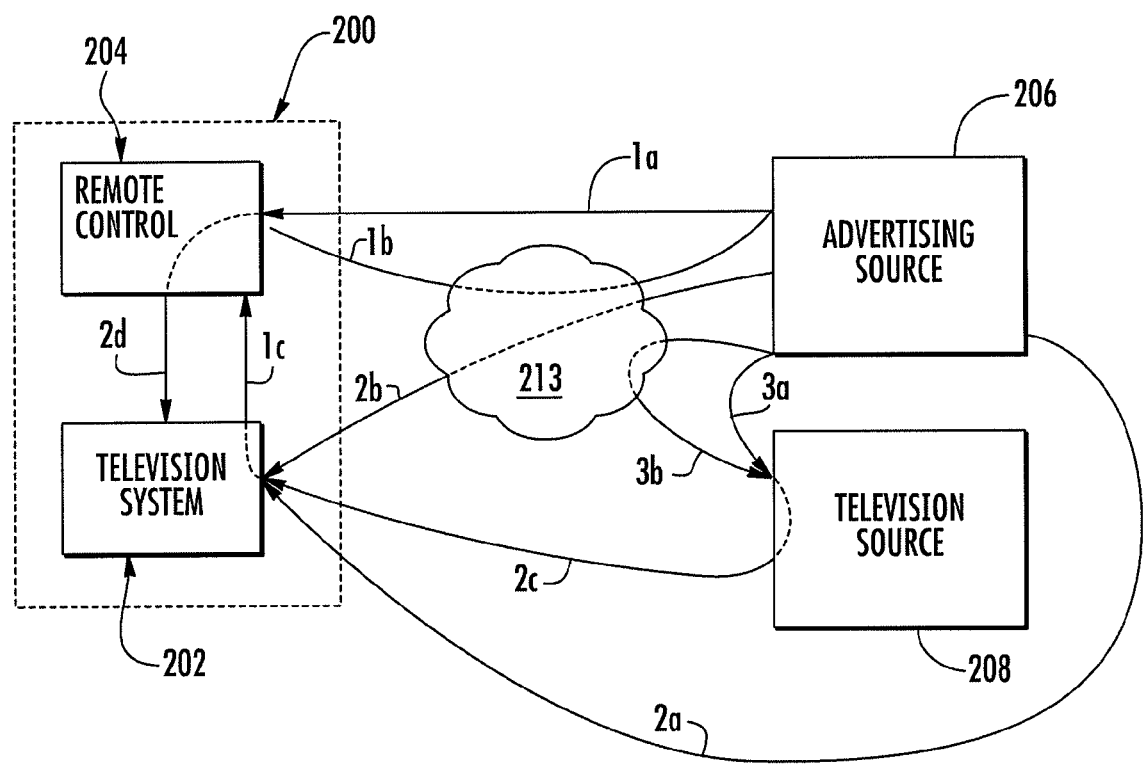
FIG. 3B is a block diagram of the communications system of FIG. 3A, illustrating the various manners in which advertising may be communicated from the advertising source to the communications system following receipt by the advertising source of a content indication signal.

Referring to FIGS. 3B and 4, therein are respectively shown a block diagram of the communications system 200, illustrating the various manners in which advertising may be communicated from the advertising source 206 to the communications system following receipt by the advertising source of the content indication signal, and a flow chart representing the further operation of the communications system. At Block 308, the advertising source can transmit the advertising material to the communications system 200. The advertising source 206 may transmit the advertising material to the remote control 204 either directly via transmission 1a and/or through the Internet 213 via transmission 1b. Alternatively or in addition, the advertising source 206 may transmit the advertising material to the television system 202 either directly via transmission 2a and/or through the Internet 213 via transmission 2b. As another alternative or in further addition, the advertising source 206 may transmit the advertising material to the television source 208 either directly via transmission 3a and/or through the Internet 213 via transmission 3b. Transmissions 3a and 3b can be propagated from the television source 208 to the television system 202 as transmission 2c. Any of the transmissions 2a-2c received by the television system 202 can be propagated to the remote control 204 in a transmission represented by 1c, and any of the transmissions 1a and 1b received by the remote control 204 can be propagated to the television system 202 in a transmission represented by 2d.

Figure 5A:
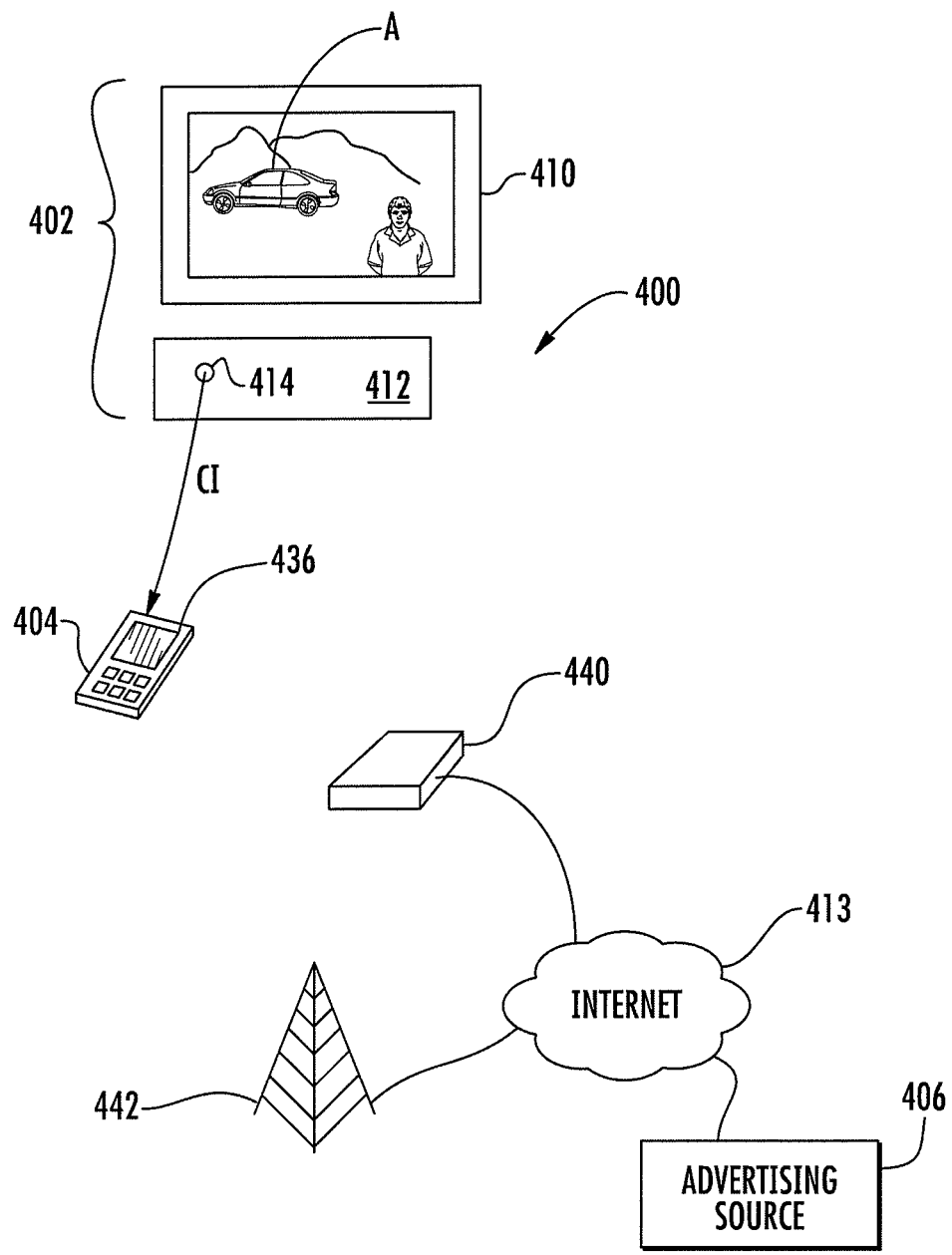
FIGS. 5A-5C are schematic diagrams representing a communications system as seen during various stages of operation with the communications system being configured in accordance with another exemplary embodiment.
Figure 5B:
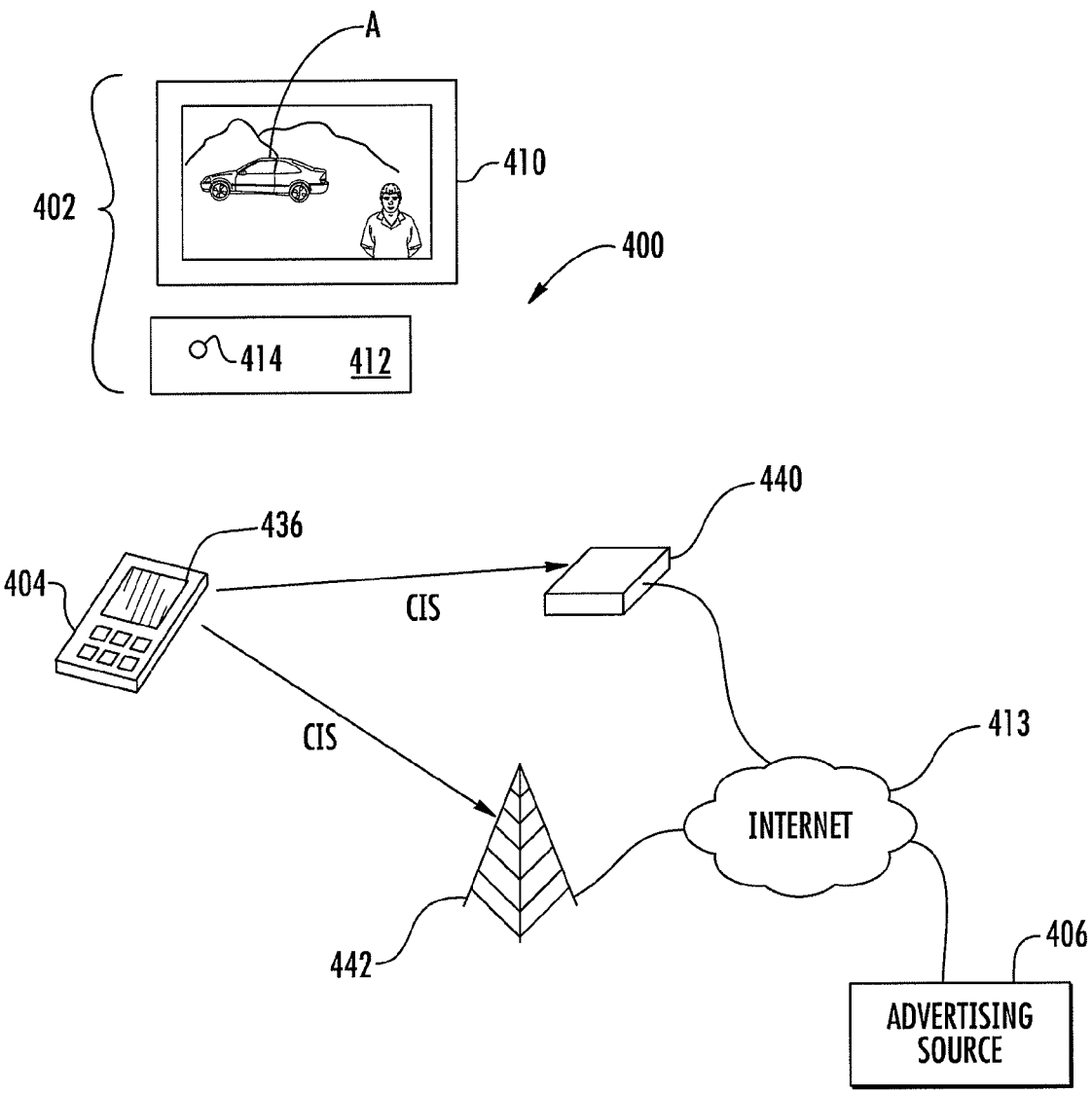
Figure 5C:
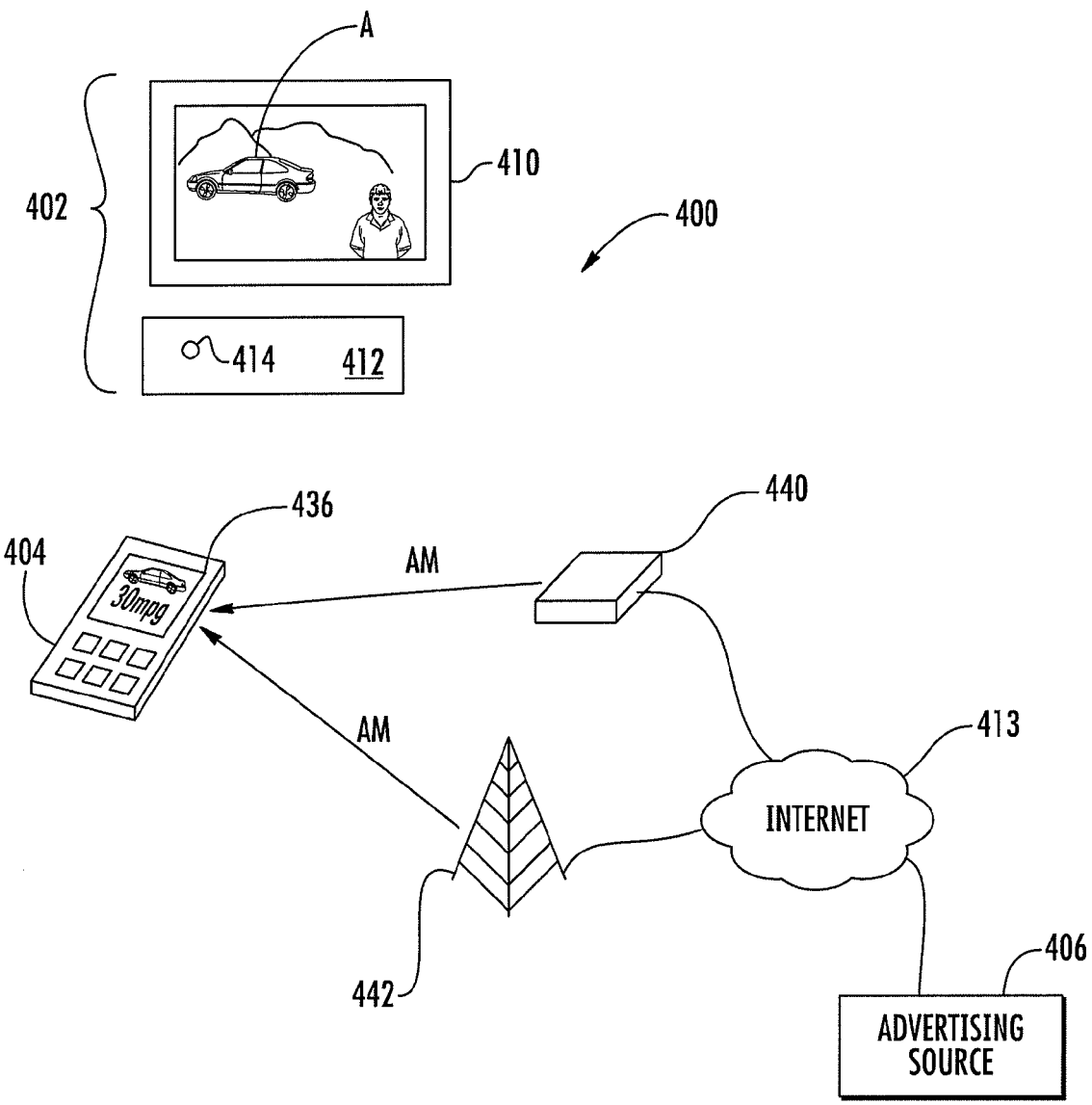

Referring to FIGS. 5A-5C, therein are shown schematic diagrams representing a communications system 400 as seen during various stages of operation, the communications system being configured in accordance with another exemplary embodiment. In FIG. 5A, content in the form of a television program has been received by a television system 402 and displayed on a television 410. The television program includes the display of an automobile A. A content indicator CI is emitted from a set top box 412 of the television system 402, say, from a wireless transceiver 414, and the content indicator CI is received by a remote control 404. The content indicator CI includes an indication of the presence of the automobile A.

In FIG. 5B, the remote control 404 sends a content indication signal CIS via a wireless connection to a wireless router 440 and/or via a wireless connection to a cellular antenna 442. Like the content indicator CI, the content indication signal CIS includes indication of the automobile A. The content indication signal CIS is transmitted via the Internet 413 to an advertising source 406. In response, in FIG. 5C, the advertising source 406 sends to the remote control 404 advertising materials AM related to the automobile A. The advertising materials AM are received by the remote control 404 and outputted via a display 436 of the remote control 404.

One or more of the above-described operations, and specifically the operations of FIG. 4, may be performed through hardware, software, or combinations thereof. As an example, embodiments may include a computer program product stored on a computer-readable storage medium (i.e., software stored in a memory unit), the computer program product comprising one or more executable portions for performing the operations described herein.

The processing units of the remote control and/or the television system may be embodied in many ways. For example, the processing units may be embodied as a processor, a controller, and/or various other processing means or devices including integrated circuits such as, for example, an application specific integrated circuit ("ASIC"). The memory units described herein may be various memory structures including volatile and non-volatile memory structures. Any of the memory units may be configured to store information, data, applications, instructions, or the like for enabling the devices disclosed herein to carry out various functions in accordance with exemplary embodiments, such as by storing software that is executable by the respective processing unit to cause the various functions of the processing unit that are described herein to be performed.

In the preceding specification, various embodiments of the claimed invention have been described. It will, however, be evident that various modifications and changes may be made thereunto without departing from the broader spirit and scope of the invention as set forth in the claims that follow. For example, while many of the above-described embodiments have focused on the receipt and utilization of content from in a television source, communications systems configured in accordance with other embodiments may receive content from a music service, photo viewing system, and/or any number of other media providers. Also, many of the above described embodiments have involved communications with an advertising source, which was described as being any source of advertising or informational materials, including, for example, an advertising server, a content provider, a broadcaster, a public service provider, and/or a product producer/distributor. It should be understood, therefore, that the term "advertising source" is to be broadly interpreted as referring to informational sources that may or may not provide traditional advertising materials. For example, the remote control could communicate with data servers other than advertising servers, such as, for example, traffic, weather, audio/music, photo, movie information, and/or a news data services. In addition, while in the exemplary system the content indicator/content indication signal includes descriptive data about television programming, the remote content indicator and/or content indication signal could contain information about the channel to which the television system is tuned, viewer identification information, biometric information (e.g., heart rate), and/or environmental information (e.g., room temperature or noise level) in order to provide services to the user. Therefore, the specification and drawings are accordingly to be regarded in an illustrative rather than restrictive sense.

That which is claimed:

1. A system comprising:
a television system comprising a set top box configured to receive content and to provide, in response to one or more triggers embedded in the received content, a content indicator representing the received content; and
a remote control including
a local communications unit configured to communicate with said television system so as to receive from said television system the content indicator,
a remote communications unit configured to
affect operation of said set top box;
connect directly to the Internet via a wireless network connection;
send a content indication signal to an advertising source via the direct wireless network connection to the Internet, the content indication signal specifying a subset of the received content represented by the content indicator, and
receive advertising comprising at least one of an audio portion or a video portion from the advertising source based on the content indication signal and by way of the direct wireless network connection to the Internet, wherein the advertising received from the advertising source is related to the subset of the received content represented by the content indicator, and wherein the advertising related to the subset of the received content is determined by the advertising source based on user-specific preferences stored by the advertising source;
a display coupled to the remote communications unit and configured to display the video portion of the received advertising; and an audio speaker configured to output the audio portion of the received advertising.

2. A system according to claim 1, wherein said television system includes a wireless transceiver and said local communications unit includes a wireless transceiver.

3. An apparatus comprising:
a local communications unit configured to communicate with a television system comprising a set top box so as to receive from the television system a content indicator representing content received by the television system, the content indicator provided by the television system in response to one or more triggers embedded in the content;
a remote communications unit configured to:
affect operation of said set top box,
connect directly to the Internet via a wireless network connection,
send a content indication signal to an advertising source via the direct wireless network connection to the Internet, the content indication signal specifying a subset of the received content represented by the content indicator, and
receive advertising comprising at least one of an audio portion or a video portion from the advertising source based on the content indication signal and by way of the direct wireless network connection to the Internet, wherein the advertising received from the advertising source is related to the subset of the received content represented by the content indicator, and wherein the advertising related to the subset of the received content is determined by the advertising source based on user-specific preferences stored by the advertising source; and
a display that displays the video portion of the received advertising; and an audio speaker that outputs the audio portion of the received advertising.

4. An apparatus according to claim 3, wherein said local communications unit includes a wireless transceiver.

5. A method comprising:
communicating, by a remote control, with a television system comprising a set top box so as to receive from the television system a content indicator representing content received by the television system, the content indicator provided by the television system in response to one or more triggers embedded in the content;

affecting, by the remote control, operation of said set top box;

sending, by the remote control, a content indication signal to an advertising source via a direct wireless network connection between the remote control and the Internet, the content indication signal specifying a subset of the received content represented by the content indicator;

receiving, by the remote control, advertising comprising at least one of an audio portion or a video portion from the advertising source based on the content indication signal by way of the direct wireless network connection between the remote control and the Internet, wherein the advertising received from the advertising source is related to the subset of the received content represented by the content indicator, and wherein the advertising related to the subset of the received content is determined by the advertising source based on user-specific preferences stored by the advertising source; and outputting, by the remote control, the received advertising by displaying the video portion of the received advertising by way of a display and outputting the audio portion of the received advertising by way of an audio speaker.

6. A method according to claim 5, wherein said communicating with the television system includes communicating with the television system via infrared radiation.

7. The method of claim 5, wherein the sending of the content indication signal to the advertising source via the direct wireless network connection to the Internet comprises sending the content indication signal to the advertising source via at least a wireless router.

\* \* \* \* \*